Aug. 8, 1939. R. W. WENGEL 2,169,011
MOTION PICTURE APPARATUS
Filed Aug. 27, 1936
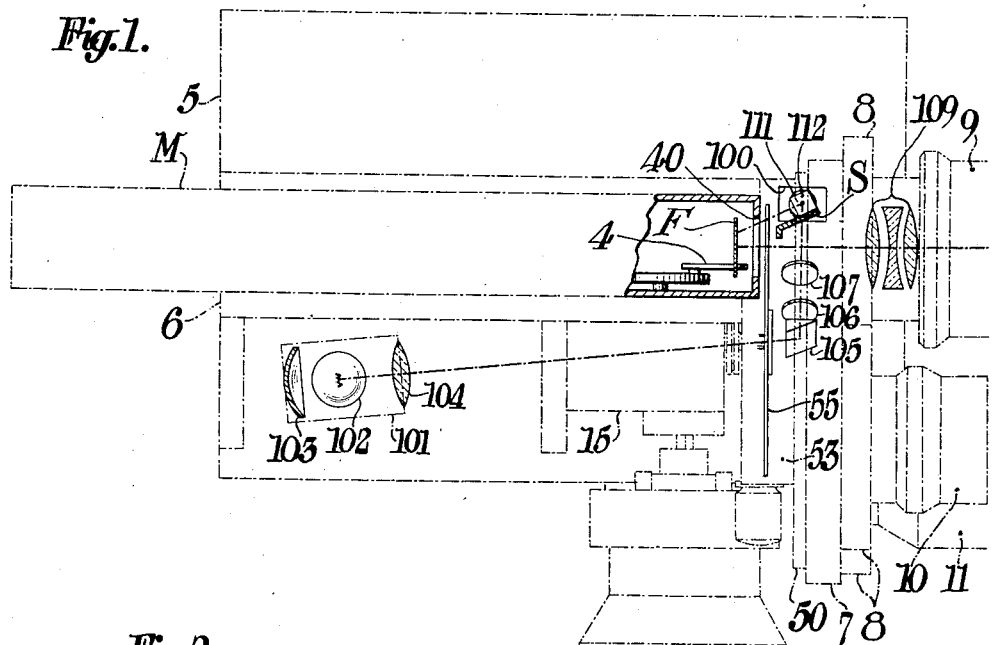
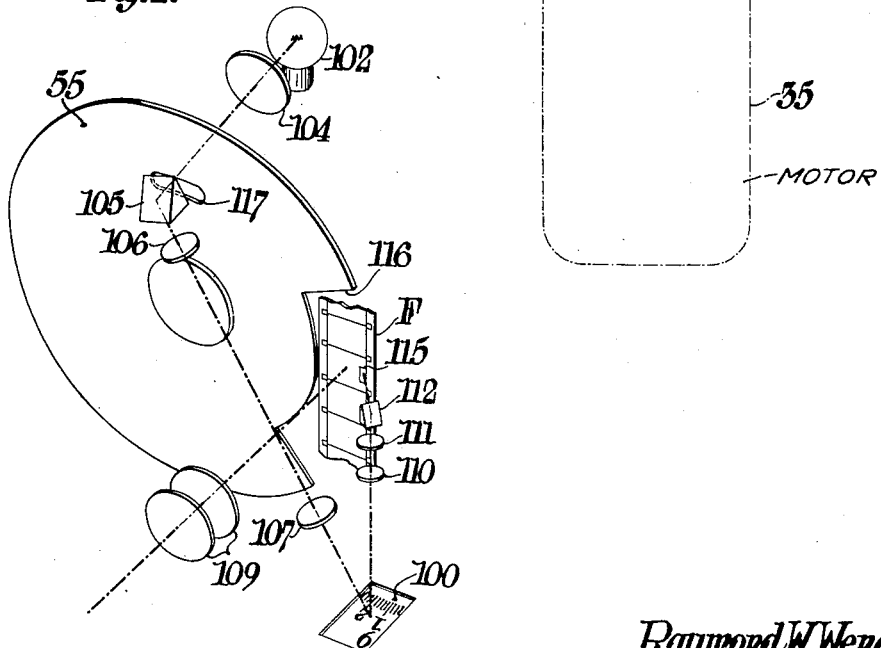
Raymond W. Wengel,
INVENTOR:
BY
ATTORNEYS.

Patented Aug. 8, 1939

2,169,011

UNITED STATES PATENT OFFICE 2,169,011

MOTION PICTURE APPARATUS

Raymond W. Wengel, Rochester, N. Y., assignor to Eastman Kodak Company, Rochester, N. Y., a corporation of New Jersey Application August 27, 1936, Serial No. 98,215

7 Claims. (Cl. 88—16)

This invention relates to photography, and particularly to a motion picture camera for photographing the finish of races, etc., and in which the camera shutter and an associated optical system are adapted to record the image of a timing mechanism on each individual picture frame of the film strip.

In photographing the finish of a horse race or the like, the main object is to obtain a distinct picture of each or a group of contestants as they reach the finish line so that the winner as well as the placing contestants can be accurately determined. In addition to deciding the winner and the position of the first few contestants in such an event, the respective time of the contestants is also required. It has been ordinary practice in events of this kind for the timing of a race to be performed by an official or a group of officials equipped with stop watches as well as having judges determine the winner and placing contestants in such an event. But since the high-speed motion picture camera has proven its worth in eliminating the error in judging a race due to the human element, it has been likewise proposed to have the camera record the time of such events and thereby eliminate all errors due to the human element.

Therefore, the primary object of my invention is to provide a motion picture camera which is not only adapted to record the finish of such sporting events as a horse race, but is also adapted to record the time of the contestants on each picture frame alongside of the picture of the finish of the race.

Another object is to provide a motion picture camera of the type referred to which is provided with a timing mechanism and an optical system which is adapted to form an image of said timing mechanism on the film in conjunction with the main image of the camera objective.

And still another object is to provide a motion picture camera of the type referred to wherein the main camera shutter is adapted to intermittently intercept the projected rays of light emanating from the timing mechanism as well as the rays projected through the main camera objective, whereby a picture of the timing mechanism is imprinted on each picture frame of the film in conjunction with the image of the main camera objective.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which, Figure 1 is a skeleton plan view of a motion picture camera, showing the relative position of the optical system for illuminating and projecting an image of a timing mechanism onto a film in conjunction with the main image of the camera objective whereby the camera shutter is adapted to control the passage of the light rays of both optical systems onto the film strip, and Figure 2 is a diagrammatic perspective of the two optical systems, and showing how the rays of light passing therethrough are intercepted by my novel shutter prior to striking the film strip.

Like reference characters refer to corresponding parts throughout the drawing.

Referring now particularly to Figure 1, wherein a preferred embodiment of my invention is shown mounted in a motion picture camera, 5 is the camera base, the top of which is divided into sections by means of a partition 6. On the top of the base 5 and at the forward end thereof is provided a turret plate 7 which extends vertically of the base 5, said turret plate being fixed to the base in any suitable manner or being cast integral therewith. A lens turret 8 having a plurality of lenses 9, 10, and 11, all of different focal lengths, mounted thereon in any suitable manner, is rotatably mounted on the turret plate 7 in such a way that any one of the lenses 9, 10, or 11 can be brought into alignment with an opening, not shown, through the turret plate 7, whereby an image formed by one of said lenses will be impinged upon the film strip F. The film magazine M which contains film supply and take-up reels, not shown, and film feeding means including an intermittently operated claw pull-down 4 for moving the film strip F past the usual exposure aperture 40 in the magazine, is adapted to be mounted on the camera base 5 in such a way that the exposure aperture 40 in the magazine M, is in alignment with the lens 9, which is shown in picture taking position, and so that its film feeding means is operated through the gear box 15 by motor 35, as fully disclosed in my co-pending application, Serial Number 95,362, filed August 11, 1936, entitled Interchangeable shutter assemblage for motion picture apparatus.

As fully disclosed in my above noted co-pending application, the shutter blade 55 is mounted on the carrier 53, and when mounted in the camera in operative position, see Figure 1, said shutter blade is adapted to be driven through the gear box 15 from motor 35; and is adapted to intercept all light rays directed onto the film strip F in the gate of the magazine M.

A timing mechanism of any sort is mounted in a hollow portion of the camera base 5 so that the face of the clock 100 associated therewith will be visible through the top of the base 5. An illuminating unit 101 is suitably mounted on the top of the base 5 so that it can be adjusted to cooperate with an optical system to illuminate the clock face 100 as will be hereinafter fully described. The illuminating unit 101 includes a lamp 102 behind which is mounted a reflector 103 and in front of which is mounted an objective 104. The light rays from the lamp 102 are directed onto a prism 105, then through two condensers 106, and 107, and onto the clock face 100, see Figure 2. The prism 105 and the condensers 106 and 107 are mounted in a channel provided between the turret plate 7 and the guide plate 50, said channel being positioned to one side of the optical axis of the main camera objective 109 so that the light rays and main image projected thereby will not conflict with the projected rays of the timing mechanism. To one side of the main optical axis is mounted an optical system including focusing lenses 110, 111, and a prism 112 which act to project the image of the clock face 100 onto the film F through the exposure aperture 40 in the magazine M along with the photographic image projected by the camera objective 109. The mounting for the prism 112 includes a shielding portion S, shown in diagrammatic sections in Figure 1, which is adapted to project into the path of the image projected by the camera objective 109 and shield a portion of the film indicated as 115, see Figure 2, therefrom so that one image will not be superimposed upon the other.

The shutter blade 55 is provided with the usual opening 116 for interrupting the image forming beam from the camera objective 109 in timed relation with the film feeding mechanism whereby a series of pictures are made on the film F. Said shutter blade 55 is also provided with an annular slot 117 which is adapted to periodically permit the light beam emanating from the lamp 102 to pass through the described optical system and illuminate the clock face 100. The angular openings 116 and slot 117 are of such a size and are so phased with respect to one another that on each picture frame there is recorded a picture of the photographic field along with a picture of the clock face. Although the image of the clock 100, projected by the optical system including lenses 110, 111 and prism 112, is projected through the shutter opening 116 along with the main image projected by objective 109 before passing to the film strip, the exposure of the clock image is not controlled thereby. The exposure of the clock face is effected as the slot 117 in the shutter 55 periodically allows the clock face to be illuminated by the lamp 102, whereby the illuminated image is projected onto the film strip F. The phase between the slot 117 and the opening 116 in the shutter is such that the illuminated image of the clock is projected through the opening 116 in the shutter to strike the film strip F. Inasmuch as the clock face is illuminated by a constant source of light 102 of desired intensity, the time required for properly exposing the same will be much less than that required for properly exposing the main photographic field upon which the light varies and is not purposely directed onto the image photographed. Due to the difference in required exposure times the exposure of the clock 100 is properly made when the slot 117 in the shutter 55 allows the light beam from lamp 102 to strike the clock face, while the exposure of the main image is made in the conventional way wherein the opening 116 in the shutter permits the projected image of the constantly illuminated main image to intermittently strike the film F. It is obvious that the angular openings 116 and 117 can be varied independently of one another, and their phase relationship can be made as desired to account for different exposure conditions and to divide each picture frame between the image produced by 109 and 100, making it possible for the image of 109 to surround the image of 100 on three sides if it be so desired. The annular slot 117 is at a lesser radius from the center of the shutter blade than is the circular portion of the shutter 55 opening 116 so that when said shutter 55 revolves and the annular slot 117 passes the image projected by the camera objective 109 no light rays passing therethrough can strike the film strip F, and for the same reason the light rays emanating from the lamp 102 will not pass through the shutter opening 116 during the revolution of the shutter 55.

While, for the purpose of illustration, I have chosen to show the motion picture camera as being of the magazine type, in which the film finding mechanism and film gate are contained in the magazine itself, it will be obvious to those skilled in the art that the camera could be one of the conventional type without going beyond the scope of the present invention. When I refer to a motion picture camera of the conventional type I have reference to one in which the film feeding mechanism, film gate, and exposure aperture are part of the camera proper and the film is threaded through the camera by hand from a supply reel to a take-up reel.

I am aware that the prior art shows motion picture cameras which are provided with suitable means for recording titles or instrument readings on a film strip in definite relation to the regular picture frame, but none of these structures show a camera wherein the image of a recording instrument is adapted to be projected through the same exposure aperture as the photographic image, the two being so arranged that a single shutter blade is adapted to control the proper intermittent interruption of both images in a given timed relation so that the two images are adapted to be projected onto each picture frame of the film strip. By providing a camera, as described in the above specification, wherein the two projected images are so positioned relative to one another that they can be properly intercepted by a single shutter blade, a simple and compact apparatus is provided which eliminates the necessity for compensating driving mechanisms between separate parts as would be needed where two separate shutters were used on apparatus having the optical system for the two images spaced far apart from one another, where the illuminating lamp was flashed on and off to eliminate the use of the shutter therefor, or where the projected images were projected through separate exposure apertures in the film gate, in which case the speed of movement of the film between the two apertures would have to be carefully controlled.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I declare as new and desire to secure by Letters Patent is:

1. In a motion picture apparatus provided with an exposure aperture the combination of a support, means for moving a film strip past said exposure aperture, an objective on said support in alignment with said exposure aperture, an indicating means on said support, a lamp mounted on said support, an optical system adapted to direct the light rays from said lamp to the indicating means, a second optical system adapted to project a real image of said indicating means through said exposure aperture, and a shutter rotatably mounted on said support adapted to intermittently interrupt the image projected by the objective and the light rays illuminating the indicating means in timed relation with the film feeding means whereby the image from the objective and the image of the indicating means are recorded on each picture frame of the film strip.

2. In a motion picture apparatus provided with an exposure aperture the combination of a support, means for feeding a film strip past said exposure aperture, an objective on said support in alignment with said exposure aperture, an indicating means on said support, a lamp adapted to illuminate said indicating means, an optical system adapted to project an image of said indicating means through said exposure aperture, and a shutter rotatably mounted on said support, said shutter provided with two slots in phase with one another whereby said shutter is adapted to intermittently interrupt the image projected through the exposurt aperture by said objective and cut off the rays of light illuminating said indicating means so that each of said images are recorde on each picture frame of said film strip.

3. In a motion picture apparatus provided with an exposure aperture the combination of a support, means for feeding a film strip past said exposure aperture, an objective on said support in alignment with said exposure aperture, an indicating means mounted on said support, a lamp on said support, an optical means adapted to direct the rays of light from said lamp to said indicating means, an optical system adapted to project the illuminated image of said indicating means through said exposure aperture, said optical system including a shield adapted to project into and shield an area of said exposure aperture from the image projected by the objective, and a shutter rotatably mounted on the support in timed relation with said film feeding means, and adapted to interrupt the image projected by the objective and cut off the light illuminating the indicating means, said shutter provided with two openings in phase with one another, the image projected by the objective adapted to pass intermittently through the exposure aperture through one of said openings, the other opening providing an intermittent illumination of the indicating means whereby the two images are recorded on each picture area of the film strip.

4. In a motion picture apparatus provided with an exposure aperture the combination of a support, means for feeding a film strip past said exposure aperture, an objective on said support in alignment with said exposure aperture, means for shielding a portion of said exposure aperture from an image projected by said objective, an indicating means, a source of light adapted to illuminate said indicating means, an optical system adapted to project an image of said indicating means through that portion of the exposure aperture shielded from the objective and a shutter provided with two apertures in phase with one another rotatably mounted on said support and adapted to interrupt the projection of the image from the objective to the exposure aperture and source of light illuminating said indicating means, one of said apertures in the shutter providing intermittent projection of the image from the objective through the exposure aperture, the other aperture providing intermittent illumination of the indicating means whereby each of the two images are adapted to be recorded on each picture frame of the film strip.

5. In a motion picture apparatus provided with an exposure aperture the combination of a support, means for feeding a film strip past said exposure aperture, an objective mounted on said support in alignment with said exposure aperture, an indicating means on the support, a lamp on the support adapted to illuminate said indicating means, an optical system adapted to project an image of said indicating means through said exposure aperture, a portion of said optical system adapted to project into said exposure aperture to interrupt the image projected by the objective, a shutter blade rotatably mounted on the support and adapted to interrupt the image projected by the objective from passing through the exposure aperture and adapted to interrupt the light rays illuminating the indicating means, said shutter blade provided with a pair of apertures in phase with one another, one aperture providing intermittent projection of the image from the objective through the exposure opening, and the other aperture providing intermittent illumination of the indicating means whereby the images projected by the main objective and the optical system are adapted to be recorded on each picture frame of a film strip.

6. In a motion picture apparatus provided with an exposure aperture, the combination with a support, means for feeding a film strip past said exposure aperture, an objective on the support in alignment with the exposure aperture for projecting an image of one subject through the exposure aperture, means for directing a beam of light onto a second subject, optical means for projecting an image of said illuminated second subject through the exposure aperture, of a shutter rotatably mounted on the support in timed relation to said film advancing means and arranged to intercept the projection of the image by the objective and to cut off the light beam from the second subject, said shutter provided with one opening through which the image of the first subject is adapted to be projected through the exposure aperture, and a second opening in phase with said first opening through which the light beam is adapted to pass to said second subject, whereby the two images are adapted to be recorded on each picture frame of the film strip.

7. In a motion picture apparatus provided with an exposure aperture, the combination with a support, means for feeding a film strip past said exposure aperture, an objective on the support in alignment with said exposure aperture, an indicating means on the support, a lamp on the support, means for directing a beam of light from said lamp onto said indicating means, an optical system for projecting an image of the indicating means through said exposure aperture, of a shutter rotatably mounted on the support in timed relation with said film feeding means and arranged to intercept the images projected by the objective and the optical means and cut off the light rays of the lamp from the indicating means, said shutter provided with one opening through which the images projected by the objective and said optical system are adapted to pass through the exposure aperture, and a second opening in phase with the first through which the light beam is adapted to pass to illuminate said indicating means, whereby the two images are adapted to be recorded on each picture frame of the film strip.

RAYMOND W. WENGEL.